(12) United States Patent
Hara et al.

(10) Patent No.: US 11,148,738 B2
(45) Date of Patent: Oct. 19, 2021

(54) VEHICLE

(71) Applicant: TOYOTA JIDOSHA KABUSHIKI KAISHA, Aichi-ken (JP)

(72) Inventors: Yasuhiro Hara, Nagoya (JP); Ayano Tsuruta, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 74 days.

(21) Appl. No.: 16/752,698

(22) Filed: Jan. 27, 2020

(65) Prior Publication Data
US 2020/0262500 A1 Aug. 20, 2020

(30) Foreign Application Priority Data

Feb. 20, 2019 (JP) .............................. JP2019-028917

(51) Int. Cl.
| | |
|---|---|
| *B60K 1/04* | (2019.01) |
| *B62D 63/02* | (2006.01) |
| *B62D 21/11* | (2006.01) |
| *B60N 2/30* | (2006.01) |
| *B60P 1/43* | (2006.01) |
| *B60L 50/60* | (2019.01) |

(52) U.S. Cl.
CPC .............. *B62D 63/025* (2013.01); *B60K 1/04* (2013.01); *B60L 50/66* (2019.02); *B60N 2/3097* (2013.01); *B60P 1/431* (2013.01); *B62D 21/11* (2013.01); *B60K 2001/0438* (2013.01)

(58) Field of Classification Search
CPC ....... B62D 63/025; B62D 21/11; B60L 50/66; B60K 1/04; B60N 2/3097; B60P 1/431
See application file for complete search history.

(56) References Cited

U.S. PATENT DOCUMENTS

| | | | | |
|---|---|---|---|---|
| 5,921,578 | A * | 7/1999 | Sekita ...................... | B60K 1/04 280/788 |
| 6,193,273 | B1 * | 2/2001 | Novak .................... | B62D 21/00 280/781 |
| 6,220,380 | B1 * | 4/2001 | Mita ........................ | B60K 1/04 180/65.1 |

(Continued)

FOREIGN PATENT DOCUMENTS

JP 2018-176858 A 11/2018

OTHER PUBLICATIONS

Unpublished U.S. Appl. No. 16/543,808, filed Aug. 19, 2019.

*Primary Examiner* — John D Walters
*Assistant Examiner* — James J Triggs
(74) *Attorney, Agent, or Firm* — Hauptman Ham, LLP

(57) ABSTRACT

A vehicle including: a pair of suspension towers, each of which houses, in an upright state, a suspension unit configured to provide suspension to a front wheel; a power unit compartment that is provided between the pair of suspension towers, and that houses at least a drive unit configured to drive the front wheels; at least one of a high voltage component or a low voltage component, configuring a sub unit disposed at a vehicle upper side of the suspension towers; and a driving seat that is disposed in a vehicle cabin at the vehicle upper side of the power unit compartment, and that is provided such that feet of a driver are positioned further toward a vehicle lower side than upper ends of the suspension towers and such that a head of the driver is positioned further toward the vehicle upper side than the sub unit.

8 Claims, 3 Drawing Sheets

(56) References Cited

U.S. PATENT DOCUMENTS

| | | | | |
|---|---|---|---|---|
| 7,802,839 B2* | 9/2010 | Ajisaka | ............... | B60K 1/04 |
| | | | | 296/187.09 |
| 9,511,657 B2* | 12/2016 | Engler | ............... | B60L 53/80 |
| 2018/0095473 A1 | 4/2018 | Fakhfakh et al. | | |
| 2018/0290531 A1 | 10/2018 | Ajisaka | | |

* cited by examiner

VEHICLE

CROSS-REFERENCE TO RELATED APPLICATION

This application is based on and claims priority under 35 USC 119 from Japanese Patent Application No. 2019-028917 filed on Feb. 20, 2019, the disclosure of which is incorporated by reference herein.

BACKGROUND

Technical Field

The present disclosure relates to a vehicle, and relates in particular to a vehicle adapted for autonomous driving.

Related Art

The specification of United States Patent Application No. 2018/0095473 discloses an electric vehicle intended for completely autonomous driving. Although this related art discusses the placement of various sensors in the electric vehicle, it does not discuss the placement of a motor, battery, air conditioner, or the like.

Even in vehicles capable of autonomous driving, if it is anticipated that a driver may be required to operate the vehicle in certain cases, a layout that enables efficient utilization of vehicle space when a driving seat is provided is desirable.

SUMMARY

In consideration of the above circumstances, an object of the present disclosure is to provide a vehicle enabling a driving seat to be disposed such that a field of view is secured in cases in which the placement of units and components involved in vehicle travel is concentrated toward the front wheels.

A vehicle of a first aspect includes a pair of suspension towers, each of which houses, in an upright state, a suspension unit configured to provide suspension to a front wheel, a power unit compartment that is provided between the pair of suspension towers, and that houses at least a drive unit configured to drive the front wheels, at least one of a high voltage component or a low voltage component, configuring a sub unit disposed at a vehicle upper side of the suspension towers, and a driving seat that is disposed in a vehicle cabin at the vehicle upper side of the power unit compartment, and that is provided such that feet of a driver are positioned further toward a vehicle lower side than upper ends of the suspension towers and such that a head of the driver is positioned further toward the vehicle upper side than the sub unit.

The vehicle of the first aspect is capable of both autonomous driving and being driven by an occupant. The vehicle includes the power unit compartment at a vehicle front side, and the drive unit is housed at a vehicle width direction center of the power unit compartment. The vehicle also includes the suspension towers on both vehicle width direction sides of the power unit compartment. At least one of the high voltage component or low voltage component, configuring a sub unit, is disposed at the vehicle upper side of the suspension towers. The vehicle further includes the driving seat at the vehicle upper side of the power unit compartment. The driving seat is configured such that in the vehicle vertical direction, the feet of the driver are disposed further toward the vehicle lower side than the upper ends of the suspension towers and further toward the vehicle upper side than the power unit compartment, and such that the head of the driver is disposed further toward the vehicle upper side than the sub unit. The vehicle of the first aspect enables the driving seat to be disposed such that a field of view is secured in cases in which the placement of units and components involved in vehicle travel is concentrated toward the front wheels.

A vehicle of a second aspect is the vehicle of the first aspect, wherein the driving seat is configured so as to be removable from the vehicle cabin or stowable within the vehicle cabin.

The vehicle of the second aspect enables a wide range of the interior of the vehicle cabin to be utilized during autonomous driving.

A vehicle of a third aspect is the vehicle of the first aspect or second aspect, wherein a drive battery is disposed under a floor of the vehicle cabin at a vehicle rear side of the power unit compartment.

The vehicle of the third aspect enables the floor in the vehicle cabin to be made lower by disposing the battery under the floor of the vehicle cabin.

A vehicle of a fourth aspect is the vehicle of any one of the first aspect to the third aspect, wherein the high voltage component is disposed at the vehicle upper side of one of the pair of suspension towers, and the low voltage component is disposed at the vehicle upper side of another of the pair of suspension towers.

In the vehicle of the fourth aspect, the high voltage component and the low voltage component are disposed spaced apart from each other in the vehicle width direction. This vehicle enables electromagnetic noise generated by the high voltage component to be suppressed from affecting the low voltage component.

A vehicle of a fifth aspect is the vehicle of the fourth aspect, wherein the high voltage component is housed in a high voltage unit compartment that is partitioned off from the vehicle cabin by a partitioning wall, and an insertion opening, which allows insertion from outside the vehicle, is provided in the high voltage unit compartment.

In the vehicle of the fifth aspect, the high voltage component is covered by the partitioning wall, enabling shielding of electromagnetic noise generated by the high voltage component. Moreover, in this vehicle air is able to pass between the high voltage unit compartment and the vehicle exterior, but not the vehicle cabin, and the high voltage unit compartment is in communication with the power unit compartment. This vehicle accordingly facilitates the routing of wiring from the drive unit to the high voltage component sub unit.

A vehicle of a sixth aspect is the vehicle of any one of the first aspect to the fifth aspect with the following configuration. Namely, the vehicle further includes a side ramp configured to bridge between a floor surface of the vehicle cabin and a road surface, at a side entrance/exit of a vehicle width direction side of the vehicle cabin, and a rear ramp configured to bridge between the floor surface and the road surface, at a rear entrance/exit of a vehicle rear side of the vehicle cabin.

The vehicle of the sixth aspect is provided with an entrance/exit and a ramp at both a vehicle side and vehicle rear side of the vehicle cabin configured with a low floor. This vehicle thus facilitates the entry and exit of occupants and loading and unloading of baggage.

A vehicle of a seventh aspect is the vehicle of the sixth aspect, further including a side stowing section that is provided below the floor of the vehicle cabin and that is configured to stow the side ramp, and a rear stowing section that is provided below the floor of the vehicle cabin so as to be spaced apart from the side stowing section in plan view, and that is configured to stow the rear ramp.

The vehicle of the seventh aspect enables the floor of the vehicle cabin to be made lower in comparison to cases in which two ramp stowage locations overlap each other in plan view.

The present disclosure enables a driving seat to be disposed such that a field of view is secured in cases in which the placement of units and components involved in vehicle travel is concentrated toward the front wheels.

BRIEF DESCRIPTION OF THE DRAWINGS

An exemplary embodiment of the present disclosure will be described in detail based on the following figures, wherein:

FIG. 2 is a cross-section (sectioned along line 2-2 in FIG. 1) in the vicinity of a driving seat in a vehicle cabin of a vehicle according to an exemplary embodiment, as viewed face-on.

DETAILED DESCRIPTION

Figure 1:
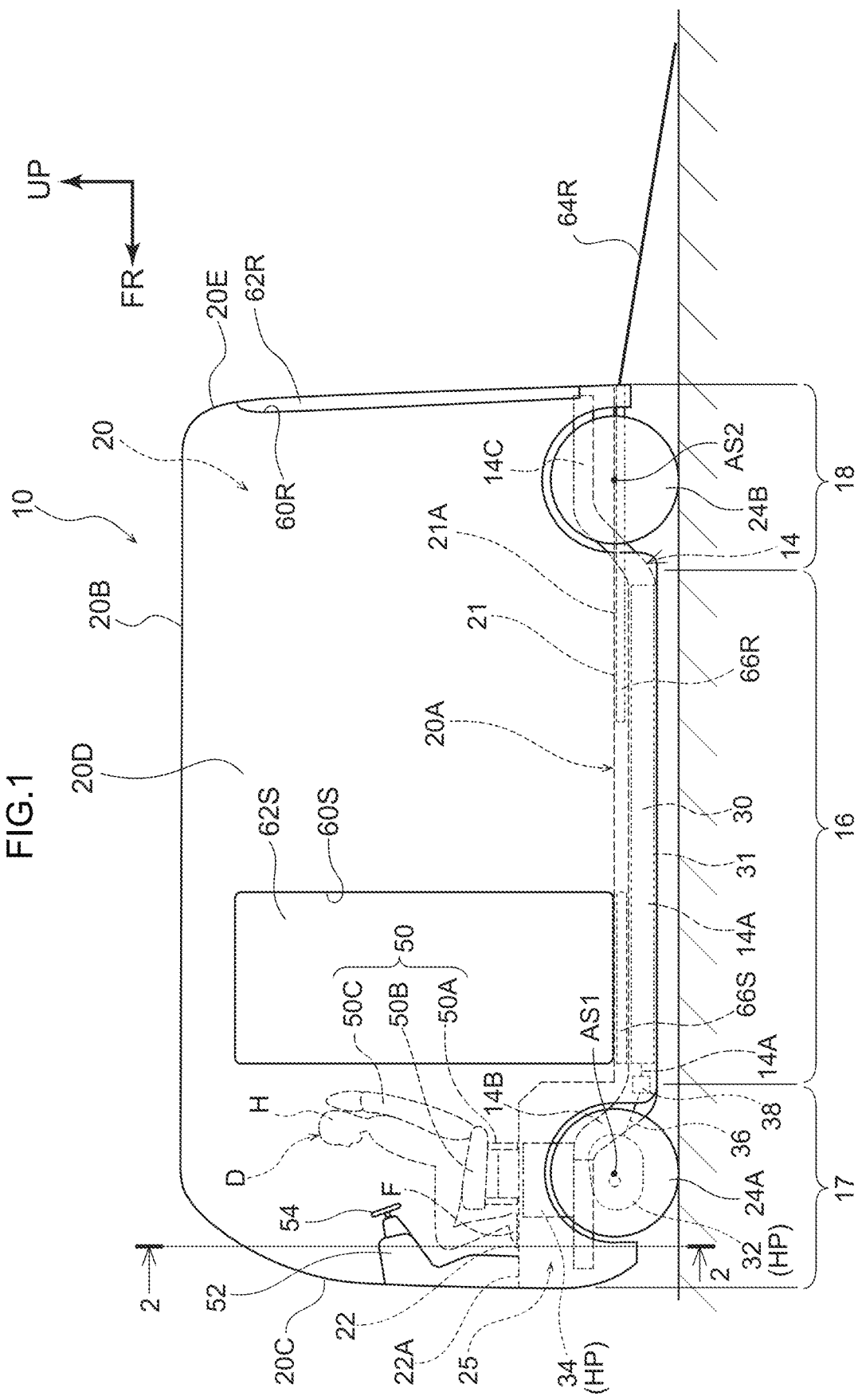
FIG. 1 is a side view of a vehicle cabin of a vehicle according to an exemplary embodiment.

Explanation follows regarding an electric vehicle according to an exemplary embodiment of the present disclosure, with reference to the drawings. Note that in the drawings, the arrow FR indicates a vehicle front side, the arrow UP indicates a vehicle upper side, and the arrow RH indicates a vehicle width direction right side.

Configuration

A vehicle 10 of the present exemplary embodiment is an electric vehicle capable of both autonomous driving and being driven by an occupant. Autonomous driving is normally performed, but the vehicle 10 may be driven by an occupant in cases in which the vehicle 10 is traveling on a road where autonomous driving is not permitted, in order to avoid danger, or at other desired timings. As illustrated in FIG. 1, the vehicle 10 has a substantially rectangular block shaped external profile enclosed by a roof 20B, a front wall section 20C, side wall sections 20D, and a rear wall section 20E. Front wheels 24A are provided at the vehicle front side and rear wheels 24B are provided at the vehicle rear side of the vehicle 10.

The vehicle 10 of the present exemplary embodiment is configured by joining together plural modules. The vehicle 10 is configured including a center module 16 configuring a vehicle front-rear direction central section, a front module 17 joined to the vehicle front side of the center module 16, and a rear module 18 joined to the vehicle rear side of the center module 16. A boundary between the front module 17 and the center module 16 is located slightly to the vehicle rear of the front wheels 24A, and a boundary between the center module 16 and the rear module 18 is located slightly to the vehicle front of the rear wheels 24B. Note that in the following explanation, in terms of the vehicle front-rear direction of the vehicle 10, the section where the front module 17 is located is referred to as a vehicle front section, the section where the center module 16 is located is referred to as a vehicle central section, and the section where the rear module 18 is located is referred to as a vehicle rear section.

Note that the center module 16, the front module 17, and the rear module 18 may be modules configuring only a lower side of the vehicle. In such cases, the vehicle 10 is formed by joining an additional roof module configuring the vehicle upper side to the center module 16, the front module 17, and the rear module 18 that have been joined together.

The center module 16 is configured including vehicle front-rear direction central portions of the respective side wall sections 20D, and a battery case 31, described later. Note that plural types of center modules 16 may be prepared with different vehicle front-rear direction lengths so as to enable the overall length of the vehicle 10 to be changed.

The front module 17 is configured including the front wall section 20C and vehicle front portions of the respective side wall sections 20D. The front module 17 is also configured including a drive unit 32, a power unit 34, a junction box 40, an air conditioner electric compressor 42, a PTC heater 44, an autonomous driving unit 46, ECUs 48, and a blower 49, described later (see FIG. 2).

The rear module 18 is configured including the rear wall section 20E, and vehicle rear portions of the respective side wall sections 20D.

A pair of side members 14 are provided extending along the vehicle front-rear direction at the vehicle lower side of the vehicle 10. Each of the side members 14 includes a center side member 14A extending from the vehicle rear side of the front wheels 24A to the vehicle front side of the rear wheels 24B. Each of the side members 14 also includes a front side member 14B that curves from a front end of the corresponding center side member 14A toward the vehicle width direction inner side and vehicle upper side, and then extends toward the vehicle front side. Each of the side members 14 further includes a rear side member 14C that curves from a rear end of the corresponding center side member 14A toward the vehicle width direction inner side and vehicle upper side, and then extends toward the vehicle rear side. Note that the center side members 14A are provided to the center module 16, the front side members 14B are provided to the front module 17, and the rear side members 14C are provided to the rear module 18.

The drive unit 32 for driving the front wheels 24A is fixed to the front side members 14B. A rear axle that supports the rear wheels 24B is fixed to the rear side members 14C.

Figure 2:
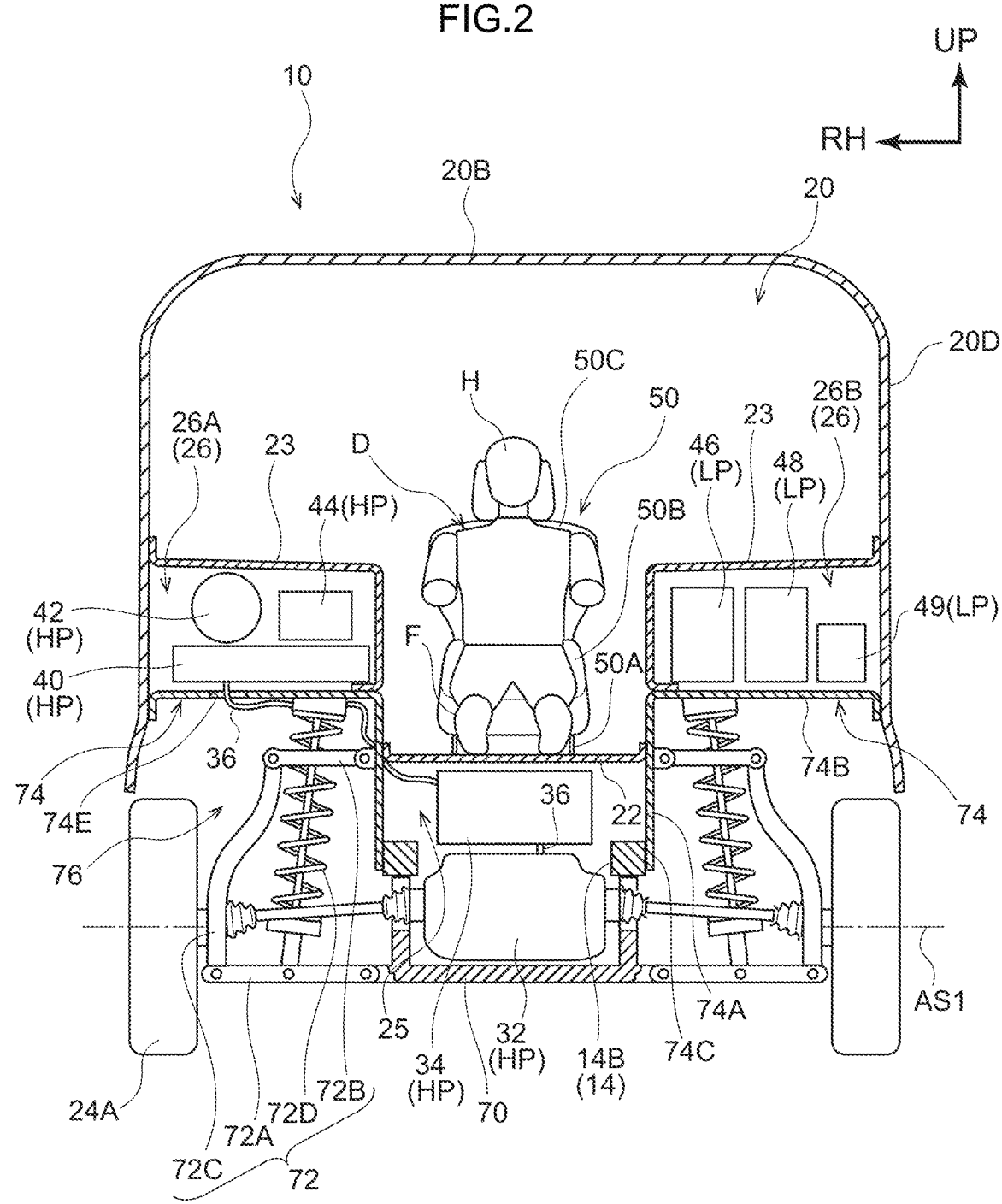

As illustrated in FIG. 2, a suspension member 70 is fixed by bolts or the like to the vehicle lower side of the front side members 14B. A pair of front suspensions 72 that provide suspension to the front wheels 24A are disposed at the vehicle width direction outer sides of the front side members 14B and the suspension member 70. Each of the front suspensions 72 of the present exemplary embodiment is a double wishbone suspension, and includes a lower arm 72A, an upper arm 72B, a knuckle 72C, and a suspension unit 72D.

The lower arm 72A is an arm that extends along the vehicle width direction at the vehicle lower side. A vehicle width direction inner end portion of the lower arm 72A is supported so as to be capable of swinging in the vehicle vertical direction with respect to the suspension member 70, and a vehicle width direction outer end portion of the lower arm 72A is supported so as to be capable of swinging in the vehicle vertical direction with respect to the knuckle 72C.

The upper arm 72B is an arm extending along the vehicle width direction at the vehicle upper side. A vehicle width direction inner end portion of the upper arm 72B is supported so as to be capable of swinging in the vehicle vertical direction with respect to a side wall portion 74A, described later, and a vehicle width direction outer end portion of the upper arm 72B is supported so as to be capable of swinging in the vehicle vertical direction with respect to the knuckle 72C.

The knuckle 72C swingably supports the vehicle width direction outer end portions of the lower arm 72A and the upper arm 72B, and also rotatably supports the corresponding front wheel 24A.

The suspension unit 72D includes a damper and a spring. A vehicle lower side end portion of the suspension unit 72D is supported by a substantially vehicle width direction central portion of the lower arm 72A, and a vehicle upper side end portion of the suspension unit 72D is supported by an upper wall portion 74B, described later.

A pair of suspension towers 74 are respectively fixed by welding to the vehicle width direction outer sides of the front side members 14B. Each of the suspension towers 74 is plate shaped, and includes the side wall portion 74A, the upper wall portion 74B, and a lower join portion 74C. The side wall portion 74A extends along the vehicle vertical direction such that its plate faces face substantially in the vehicle width direction. The upper wall portion 74B is integrally formed to the side wall portion 74A so as to extend continuously from an upper end of the side wall portion 74A toward the vehicle width direction outer side. As described above, the suspension unit 72D is supported by the upper wall portion 74B. The lower join portion 74C is a portion extended toward the vehicle lower side from the side wall portion 74A and fixed to the corresponding front side member 14B. In the present exemplary embodiment, a floor panel 22 is provided to as to connect the side wall portions 74A on both vehicle width direction sides together.

In the present exemplary embodiment, a power unit compartment 25 is configured by a space enclosed by the suspension towers 74 on both vehicle width direction sides, the suspension member 70, and the floor panel 22. In face-on view, the power unit compartment 25 is provided between the pair of suspension towers 74.

The drive unit 32, and the power unit 34 disposed at the vehicle upper side of the drive unit 32, are housed in the power unit compartment 25 of the present exemplary embodiment. The drive unit 32 includes at least a unitized vehicle travel motor and transaxle. The power unit 34 supplies power to the vehicle travel motor, and the power unit 34 includes at least a unitized boost converter and inverter. The drive unit 32 and the power unit 34 configure high voltage components HP that are driven by applying a high voltage (for example 200V or higher). A radiator for cooling the vehicle travel motor and so on, and an air conditioner condenser are also housed in the power unit compartment 25.

As illustrated in FIG. 1, the power unit 34 is electrically connected to a battery 30, described later, by a high voltage cable 36. The high voltage cable 36 is provided with a power connector 38 at a join portion between the center module 16 and the front module 17.

As illustrated in FIG. 2, in the present exemplary embodiment, sub unit compartments 26 are configured by spaces at the vehicle upper side of the respective suspension towers 74 that are each enclosed by a room side panel 23, serving as a partitioning wall. The sub unit compartments 26 include a high voltage unit compartment 26A provided at the vehicle upper side of the suspension tower 74 on the vehicle width direction right side, and a low voltage unit compartment 26B provided at the vehicle upper side of the suspension tower 74 on the vehicle width direction left side. In the present exemplary embodiment, an upper end of the high voltage unit compartment 26A and an upper end of the low voltage unit compartment 26B are formed so as to be positioned at the same height as each other.

The junction box 40, the air conditioner electric compressor 42, and the PTC heater 44, these being high voltage components HP, are housed in the high voltage unit compartment 26A of the present exemplary embodiment. The junction box 40 distributes high voltage power supplied from the battery 30 or the power unit 34 to the air conditioner electric compressor 42, the PTC heater 44, and so on. The junction box 40, the air conditioner electric compressor 42, and the PTC heater 44 correspond to sub units. Note that a DC-DC convertor for stepping down a high voltage used for drive power to a low voltage used for accessory power, and an onboard charger for charging the battery 30 using an external power source may also be housed in the high voltage unit compartment 26A as other high voltage components HP.

An insertion opening 74E provided in the upper wall portion 74B penetrates to the vehicle exterior of the high voltage unit compartment 26A (specifically, to the interior of a wheelhouse 76). A gap formed between the front side member 14B and corresponding suspension tower 74, or between the front side member 14B and the corresponding suspension member 70, penetrates to the vehicle exterior of the power unit compartment 25 (specifically, to the interior of the wheelhouse 76). Namely, the high voltage unit compartment 26A and the power unit compartment 25 of the present exemplary embodiment are in communication with each other through the wheelhouse 76. The power unit 34 and the junction box 40 are thereby connected together by inserting the high voltage cable 36 through the insertion opening 74E.

Low voltage components LP that are driven by applying a low voltage (for example 12V) are housed in the low voltage unit compartment 26B of the present exemplary embodiment. The low voltage components LP include the autonomous driving unit 46 serving as a control unit, the ECUs 48, the air conditioner blower 49, and so on. A washer unit for sensor cleaning, small batteries used for accessories, and the like are also housed in the low voltage unit compartment 26B as other low voltage components LP. The autonomous driving unit 46, the ECUs 48, the blower 49, the washer unit, and the small batteries correspond to sub units.

The autonomous driving unit 46 is configured including an autonomous driving ECU that controls autonomous driving of the vehicle 10, an interface ECU that controls communication between a steering unit and an acceleration/deceleration unit, and the like. Plural sensors that ascertain the situation in the surroundings of the vehicle 10 are connected to the autonomous driving unit 46 by signal cables. These sensors include a camera that images a predetermined range, millimeter-wave radar that transmits exploratory waves over a predetermined range, and light detection and ranging/laser imaging detection and ranging (LIDAR) that scans a predetermined range. The ECUs 48 include ECUs other than those used for autonomous driving, such as a body control system ECU and a multimedia ECU.

As illustrated in FIG. 1, the battery 30 is housed under the floor of a vehicle cabin 20, specifically, at the vehicle lower side of a floor panel 21 at the vehicle central section. More specifically, the battery 30 is provided between the pair of center side members 14A disposed at the vehicle central section, and is housed in the battery case 31 that is fixed to the center side members 14A.

In the present exemplary embodiment, a floor surface 20A, serving as a floor, is formed by the floor panel 22 that partitions between the power unit compartment 25 and the vehicle cabin 20, and by the floor panel 21 that partitions between the battery case 31 and the vehicle cabin 20. The floor surface 20A includes a lower floor section 21A configured by the floor panel 21, and a raised front floor section 22A that is configured by the floor panel 22 at a higher position than the floor surface 20A at the lower floor section 21A. In the present exemplary embodiment, a portion of the floor surface 20A corresponding to the lower floor section 21A from the vehicle central section to the vehicle rear section is formed as a flat floor surface.

The lower floor section 21A is positioned further toward the vehicle lower side than a vehicle axle shaft AS1 of the front wheels 24A and a vehicle axle shaft AS2 of the rear wheels 24B. The battery case 31 is disposed at the vehicle lower side of the lower floor section 21A. The vehicle cabin 20 is formed with sufficient height for an onboard occupant to stand upright on the lower floor section 21A. Note that an occupant may be exemplified by a dummy of an adult with a standard (average) build, such as a world side impact dummy (world SID) of an American adult male in the $50^{th}$ percentile (AM50). Namely, the vehicle cabin 20 of the present exemplary embodiment has a height at which there is clearance between the head of an AM50 dummy and the roof 20B in a state in which the AM50 dummy is standing upright on the lower floor section 21A. Note that the example of an occupant is not limited to an AM50 dummy, and may be another crash test dummy or a model with a statistically obtained standard build.

A seat 50, serving as a driving seat on which a driver D can sit, is provided at the raised front floor section 22A. The seat 50 includes a frame 50A fixed to the floor panel 22, a seat cushion 50B fixed to the frame 50A and including a seat surface, and a seatback 50C fixed to the seat rear side of the seat cushion 50B. A dashboard 52 is disposed running along the front wall section 20C at the vehicle front side of the seat 50. A steering wheel 54 is disposed on the dashboard 52 so as to face the driver D. Pedals (an accelerator pedal and a brake pedal) are disposed at the vehicle lower side of the dashboard 52.

As illustrated in FIG. 2, the seat 50 is provided between the pair of suspension towers 74, and between the high voltage unit compartment 26A and the low voltage unit compartment 26B in the vehicle width direction. The seat 50 is configured such that the feet F of the seated driver D are positioned further toward the vehicle lower side than the upper wall portions 74B of the suspension towers 74, and further toward the vehicle upper side than the power unit compartment 25. The seat 50 is also configured such that the head H of the seated driver D is positioned further toward the vehicle upper side than the high voltage unit compartment 26A and the low voltage unit compartment 26B.

As illustrated in FIG. 1, a rear entrance/exit 60R enabling an adult occupant to walk onto or off the vehicle is provided in the rear wall section 20E at the vehicle rear side of the vehicle cabin 20. The rear entrance/exit 60R is closed off by a hinged door 62R that is swingably fixed to one vehicle width direction end of the rear entrance/exit 60R. A rear ramp 64R that extends diagonally downward from the lower floor section 21A toward the road is also provided to the rear entrance/exit 60R. Namely, when in use, the rear ramp 64R bridges between the lower floor section 21A and the road. When the vehicle 10 is traveling, the rear ramp 64R is stowed in a rear stowing section 66R (see FIG. 3) provided between the floor panel 21 and the battery case 31, and is pulled out from the rear stowing section 66R toward the vehicle rear side when in use for an occupant to enter or exit the vehicle.

A side entrance/exit 60S enabling an adult occupant to walk onto or off the vehicle is provided in one of the side wall sections 20D at a vehicle side (the vehicle width direction left side) of the vehicle cabin 20. The side entrance/exit 60S is closed off by a sliding door 62S that is slidably fixed to the vehicle rear side of the side entrance/exit 60S. A side ramp 64S that extends diagonally downward from the lower floor section 21A toward a sidewalk (or the road) is also provided to the side entrance/exit 60S. Namely, when in use, the side ramp 64S bridges between the lower floor section 21A and the sidewalk (or the road). When the vehicle 10 is traveling, the side ramp 64S is stowed in a side stowing section 66S (see FIG. 3) provided in a gap between the floor panel 21 and the battery case 31, and is pulled out from the side stowing section 66S toward the vehicle width direction left side when in use for an occupant to enter or exit the vehicle.

Figure 3:
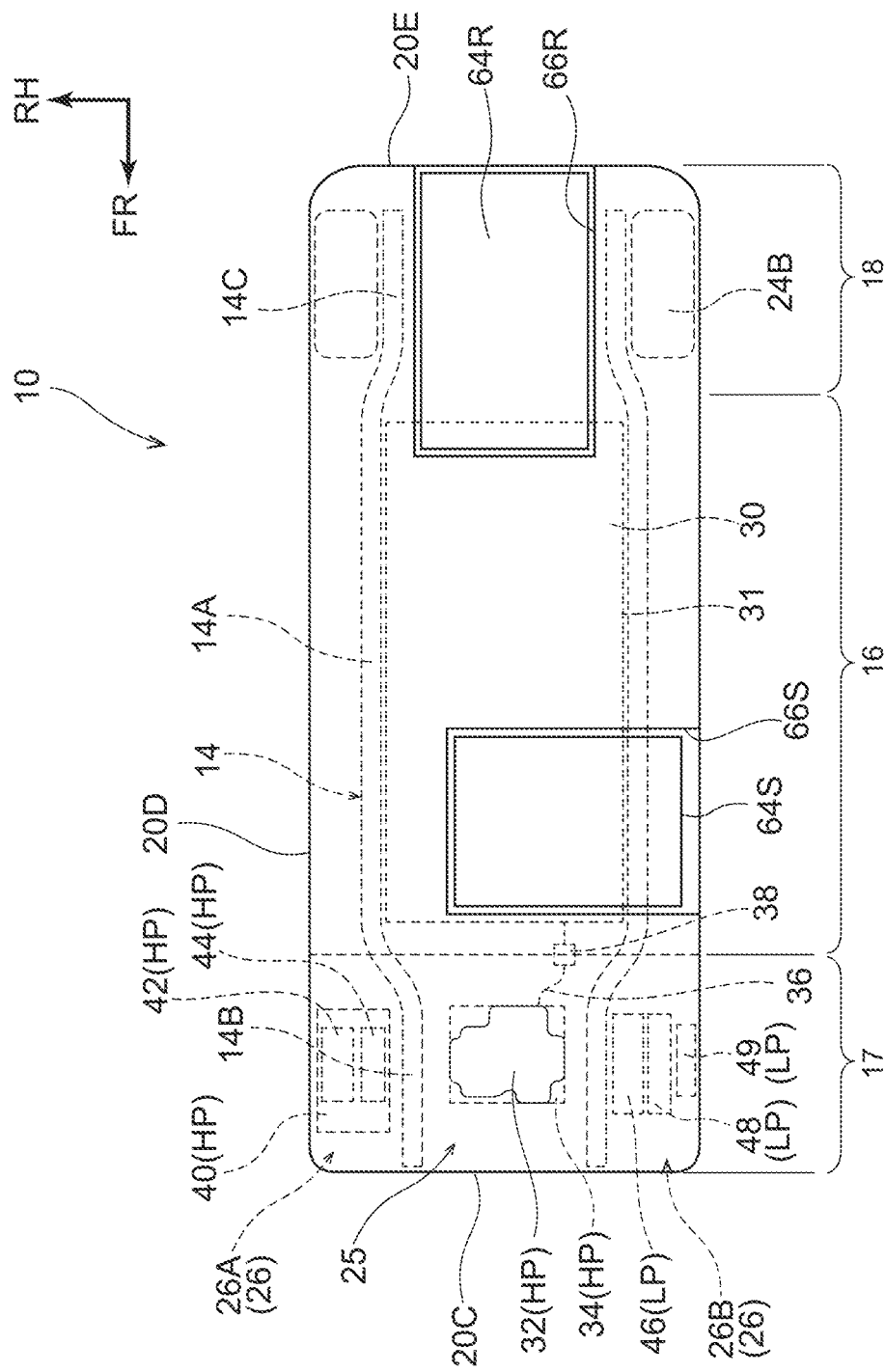
FIG. 3 is a plan view of a vehicle cabin of a vehicle according to an exemplary embodiment.

As illustrated in FIG. 3, the side stowing section 66S is disposed at a position spaced apart from the rear stowing section 66R so as not to overlap the rear stowing section 66R in plan view. Namely, the side ramp 64S is stowed at a position spaced apart from the rear ramp 64R so as not to overlap the rear ramp 64R in plan view.

Summary of Exemplary Embodiment

The vehicle 10 of the present exemplary embodiment includes the autonomous driving unit 46, and is capable of both autonomous driving and being driven by an occupant. The front module 17 at the vehicle front section of the vehicle 10 includes the power unit compartment 25 housing at least the drive unit 32 at the vehicle width direction center thereof, and also includes the pair of suspension towers 74 at the vehicle width direction sides of the power unit compartment 25. The sub unit compartments 26 in which the high voltage components HP and the low voltage components LP, these being sub units, are housed, are disposed at the vehicle upper side of the respective suspension towers 74. The sub unit compartments 26 include the high voltage unit compartment 26A in which the high voltage components HP are housed, and the low voltage unit compartment 26B in which the low voltage components LP are housed. Note that the high voltage components HP and the low voltage components LP include units required to move and control the vehicle 10, units required for autonomous driving, units related to air conditioning, other auxiliary devices, and the like. The vehicle 10 of the present exemplary embodiment thereby enables the placement of units and components relating to the vehicle 10 to be concentrated in the vehicle front section. This enables a wider vehicle cabin 20 to be realized.

Moreover, in the present exemplary embodiment, the seat 50, serving as a driving seat, is disposed between the high voltage unit compartment 26A and the low voltage unit compartment 26B in the vehicle width direction, and at the vehicle upper side of the power unit compartment 25. The seat 50 is installed such that the feet F of the driver D are positioned further toward the vehicle lower side than the suspension towers 74 and further toward the vehicle upper side than the power unit compartment 25, and such that the head H of the driver D is positioned further toward the vehicle upper side than the sub unit compartments 26 in the vehicle vertical direction.

Namely, in the vehicle 10 of the present exemplary embodiment, lowering the vehicle vertical direction position of the seat 50 at the vehicle front section where the placement of the units and components is concentrated enables head clearance for the driver D to be secured. Moreover, the sub unit compartments 26 are disposed at lower positions than the head H of the driver D in the vehicle vertical direction. This enables the field of view of the driver D toward the sides to be secured.

The present exemplary embodiment enables the driving seat to be disposed such that a field of view can be secured in cases in which the placement of units and components related to travel of the vehicle 10 is concentrated at the vehicle front section.

In the vehicle 10 of the present exemplary embodiment, of the principal units and components involved in moving and controlling the vehicle, only the battery 30 is not disposed in the vehicle front section, instead being disposed in the vehicle central section. In the vehicle central section, the battery 30 is disposed under the floor of the vehicle cabin 20, in other words at the vehicle lower side of the floor panel 21. The battery 30 is also disposed further toward the vehicle lower side than the vehicle axle shaft AS1 of the front wheels 24A. In the present exemplary embodiment, disposing the battery 30, which is not accommodated in the vehicle front section, under the floor of the vehicle cabin 20 at the vehicle rear side of the vehicle front section enables the floor of the vehicle cabin 20 to be made lower.

In the vehicle 10 of the present exemplary embodiment, the high voltage unit compartment 26A and the low voltage unit compartment 26B are disposed separated from each other in the vehicle width direction on either side of the driving seat. Namely, the high voltage components HP applied with high voltage and the low voltage components LP applied with low voltage are disposed separated from each other in the vehicle width direction on either side of the driving seat. Thus, the vehicle 10 of the present exemplary embodiment enables electromagnetic noise generated by the high voltage components HP to be suppressed from affecting the low voltage components LP in comparison to cases in which high voltage components HP and low voltage components LP are disposed adjacent to each other. In particular, electromagnetic noise can be suppressed from affecting the autonomous driving unit 46.

In the present exemplary embodiment, the high voltage components HP serving as sub units are accommodated in the high voltage unit compartment 26A that is partitioned off from the vehicle cabin 20 by the corresponding room side panel 23. Namely, the high voltage components HP are covered by the room side panel 23, thereby enabling shielding of electromagnetic noise generated by the high voltage components HP.

Air is able to pass between the high voltage unit compartment 26A and the vehicle exterior through the insertion opening 74E provided to the corresponding suspension tower 74. Air is also able to pass between the power unit compartment 25 and the vehicle exterior, with the result that the high voltage unit compartment 26A is in communication with the power unit compartment 25. Thus, the present exemplary embodiment facilitates the routing of wiring from the drive unit 32 to the high voltage component HP sub units. Although air is able to pass between the low voltage unit compartment 26B and the vehicle cabin 20, airtight grommets prevent air from passing between the low voltage unit compartment 26B and the power unit compartment 25, even if wiring is run between the two. Namely, air is not able to pass between the low voltage unit compartment 26B and the vehicle exterior in the present exemplary embodiment, such that the low voltage unit compartment 26B is waterproof and dustproof, enabling electronic components such as the ECUs to be protected.

Moreover, in the vehicle 10 of the present exemplary embodiment, the vehicle cabin 20 configured with a low floor is provided with the side entrance/exit 60S and the side ramp 64S at a side of the vehicle, and is provided with the rear entrance/exit 60R and the rear ramp 64R at the vehicle rear side. Thus, the present exemplary embodiment enables an occupant or a wheelchair to easily enter and exit the vehicle in cases in which the vehicle cabin 20 is utilized as an occupant boarding space. The present exemplary embodiment also enables easy loading and unloading of baggage or trolleys in the vehicle in cases in which the vehicle cabin 20 is utilized as a baggage space.

Note that in the vehicle 10 of the present exemplary embodiment, the side stowing section 66S where the side ramp 64S is stowed and the rear stowing section 66R where the rear ramp 64R is stowed are disposed spaced apart from each other so as not to overlap in plan view. Namely, the present exemplary embodiment enables the floor of the vehicle cabin 20 to be made lower than in cases in which the side stowing section 66S and the rear stowing section 66R were to overlap each other in plan view.

EXEMPLARY EMBODIMENT VARIATIONS

In the exemplary embodiment described above, the junction box 40, the air conditioner electric compressor 42, and the PTC heater 44, these being high voltage components HP, are all disposed in the high voltage unit compartment 26A. However, there is no limitation thereto. For example, some of these high voltage components HP may be disposed in the power unit compartment 25.

Moreover, in the vehicle 10 of the present exemplary embodiment, there is no limitation to aligning the vehicle vertical direction heights of the high voltage unit compartment 26A and the low voltage unit compartment 26B. The heights of the high voltage unit compartment 26A and the low voltage unit compartment 26B may be freely set according to the bulk of the units and components housed therein, within a range in which the field of view of the driver D is secured.

As described above, the vehicle 10 of the present exemplary embodiment is capable of autonomous driving. Thus, except for in cases in which the vehicle 10 is traveling on a road where autonomous driving is not permitted or cases in which the vehicle 10 is being driven by an occupant in order to avoid danger or the like, the driving seat is not necessarily required. Thus, in the present exemplary embodiment, the seat 50 and the steering wheel 54 may be configured so as to be attachable and detachable with respect to the vehicle 10. Moreover, the seat 50 may be configured so as to be housed under the floor (namely, at the vehicle lower side of the floor panel 22), or so as to spring up to lie flat against the front wall section 20C or the room side panel 23. The steering wheel 54 may be configured so as to be stowable in the dashboard 52.

Note that in the present exemplary embodiment, the steering wheel 54 and the pedals are provided as driving operation devices for the driver D. However, there is no limitation thereto. Buttons, a joystick, a touch panel, or a controller employing a combination of these methods may be provided as a driving operation device. Such the controller may be attachable and detachable with respect to the vehicle 10, or may be stowable in the dashboard 52.

As described above, in the present exemplary embodiment, configuring the seat 50 configuring a driving seat and the driving operation devices (the steering wheel 54, the pedals, and so on) so as to be removable from the vehicle cabin 20 or stowable within the vehicle cabin 20 enables a wider range of the interior of the vehicle cabin 20 to be utilized during autonomous driving. For example, the raised front floor section 22A may be utilized as a baggage loading space, or an occupant space.

Although each of the front suspensions 72 of the present exemplary embodiment is a double wishbone suspension, there is no limitation thereto. As long as the suspension units 72D are disposed in the suspension towers 74, other types of suspension, such as a strut suspension or a multilink suspension, may be applied.

What is claimed is:

1. A vehicle comprising:
   a pair of suspension towers, each of which houses, in an upright state, a suspension unit configured to provide suspension to a front wheel;
   a power unit compartment that is provided between the pair of suspension towers, and that houses at least a drive unit configured to drive the front wheels;
   at least one of a high voltage component or a low voltage component, configuring a sub unit disposed at a vehicle upper side of the suspension towers; and
   a driving seat that is disposed in a vehicle cabin at the vehicle upper side of the power unit compartment, and that is provided such that feet of a driver are positioned further toward a vehicle lower side than upper ends of the suspension towers and such that a head of the driver is positioned further toward the vehicle upper side than the sub unit.

2. The vehicle of claim 1, wherein the driving seat is configured so as to be removable from the vehicle cabin or stowable within the vehicle cabin.

3. The vehicle of claim 1, wherein a drive battery is disposed under a floor of the vehicle cabin at a vehicle rear side of the power unit compartment.

4. The vehicle of claim 1, wherein:
   the high voltage component is disposed at the vehicle upper side of one of the pair of suspension towers; and
   the low voltage component is disposed at the vehicle upper side of another of the pair of suspension towers.

5. The vehicle of claim 4, wherein:
   the high voltage component is housed in a high voltage unit compartment that is partitioned off from the vehicle cabin by a partitioning wall; and
   an insertion opening, which allows insertion from outside the vehicle, is provided in the high voltage unit compartment.

6. The vehicle of claim 1, further comprising:
   a side ramp configured to bridge between a floor surface of the vehicle cabin and a road surface, at a side entrance/exit of a vehicle width direction side of the vehicle cabin; and
   a rear ramp configured to bridge between the floor surface and the road surface, at a rear entrance/exit of a vehicle rear side of the vehicle cabin.

7. The vehicle of claim 6, further comprising:
   a side stowing section that is provided below the floor of the vehicle cabin and that is configured to stow the side ramp; and
   a rear stowing section that is provided below the floor of the vehicle cabin so as to be spaced apart from the side stowing section in plan view, and that is configured to stow the rear ramp.

8. The vehicle of claim 1, wherein:
   the vehicle is configured by joining a plurality of modules together in a vehicle front-rear direction; and
   the suspension towers, the power unit compartment, the sub unit, and the driving seat are disposed in a front module located at a front of the vehicle.

* * * * *